(12) United States Patent
Lindahl (10) Patent No.: US 6,409,121 B1
(45) Date of Patent: Jun. 25, 2002

(54) IN FLIGHT AUTOLUBRICATION SYSTEM FOR THE MECHANICAL MEMBERS OF AIRCRAFT LANDING GEAR

(75) Inventor: Gary M. Lindahl, Newcastle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/652,589

(22) Filed: Aug. 30, 2000

(51) Int. Cl.⁷ ................................................ B64C 25/02
(52) U.S. Cl. .................................................... 244/100 R
(58) Field of Search ............................ 244/1 R, 129.1, 244/100 R; 184/29, 39, 37

(56) References Cited

U.S. PATENT DOCUMENTS

| 1,465,620 | A |   | 8/1923  | Anderson           |          |
|-----------|---|---|---------|--------------------|----------|
| 1,989,451 | A |   | 1/1935  | Hull               | 184/45   |
| 3,022,863 | A | * | 2/1962  | Sensui et al.      | 184/7.2  |
| 3,985,205 | A |   | 10/1976 | Hedlund et al.     | 184/1 E  |
| 4,113,061 | A | * | 9/1978  | Peaster            | 184/41   |
| 4,326,604 | A |   | 4/1982  | Sotiropoulos       | 184/7    |
| 4,726,448 | A | * | 2/1988  | Schroeder et al.   | 184/3.2  |
| 4,787,479 | A |   | 11/1988 | Ostermeyer et al.  | 184/7.2  |
| 4,976,335 | A |   | 12/1990 | Cappellato         | 184/6.4  |
| 5,195,612 | A |   | 3/1993  | Hahn et al.        | 184/6.4  |
| 5,381,874 | A |   | 1/1995  | Hadank et al.      | 184/6.4  |
| 5,634,531 | A | * | 6/1997  | Graf et al.        | 184/37   |
| 5,839,213 | A |   | 11/1998 | Abbott et al.      | 37/443   |

* cited by examiner

Primary Examiner—Peter M. Poon
Assistant Examiner—Timothy D Collins
(74) Attorney, Agent, or Firm—Conrad O. Gardner (57) ABSTRACT

An in flight automatic lubrication system for periodic lubrication of critical cites in an aircraft landing gear. Pivot joints are lubricated during flight while in an unloaded condition.

4 Claims, 9 Drawing Sheets

IN FLIGHT AUTOLUBRICATION SYSTEM FOR THE MECHANICAL MEMBERS OF AIRCRAFT LANDING GEAR

BACKGROUND OF THE INVENTION

Modern aircraft landing gear typically comprise a main shock strut having one end pivotally attached to a portion of the airplane for swinging movement of the landing gear between a retracted and extended position. The landing gear also includes a truck beam that is pivotally attached to the other end of the main shock strut, having a plurality of wheels rotatably attached thereon. It is desirable for the truck beam to be pivotally attached to the main shock strut to permit the beam to pivot and absorb the energy associated with traversing a runway discontinuity, as well as permitting the truck beam to be positioned for stowage within the airplane.

This pivotal joint along with other landing gear mechanical members are manually lubricated at a plurality of critical sites in accordance with published maintenance schedules. These schedules generally designate the frequency of such lubricative maintenance, the amount of lubricant to be applied, and the noted sites of application. A failure to perform scheduled maintenance can accelerate wear depending on the operation of the aircraft. In situations where an aircraft is operated in non-normal service, such as those aircraft operating on the rough runways characteristic of Eastern Europe, more frequent lubricative maintenance is needed.

Aircrafts operating on rough runways experience more aggressive landing gear tress. Premature pivot joint failure can be caused by the heat generated by high frequency truck beam pivoting that is characteristic of rough runway operation. Inspection of failed pivot joints has indicated that the frictional heating adversely affects the metallurgical properties of the associated assemblies causing them to become hard, brittle and susceptible to crack formation leading to ultimate failure.

Airplane operators have responded with more frequent lubricative maintenance. However, the additional time required to perform the procedure contributes unfavorably to aircraft productivity. Further, it has been observed that the relubrication of the highly loaded pivot joints typical of an airplane being supported by the extended landing gear is ineffective. In this orientation, the pivot joint bearings are loaded primarily through less than their full bearing circumference. This results in the unloaded portion of the bearing defining a gap 24, through which new lubricants have been found to take the path of least resistance, leaving the loaded portions deficient of lubrication.

BRIEF SUMMARY OF THE INVENTION

For the foregoing reasons there is a need for an aircraft landing gear autolubrication system that performs periodic lubrication to a plurality of critical sites, without impact to aircraft productivity, and one that can be retrofitted easily to aircraft. The present invention is directed to a method and system that satisfies these needs. According to one aspect of the invention, a method for automatically lubricating an aircraft landing gear is provided. The method includes providing a lubricant supply distribution system for dispensing a lubricant; sensing aircraft landing gear parameters indicative of the landing gear's extended or retracted positional state; providing a timer to control the duration of the lubrication cycle; measuring intervals of time for the duration of the lubrication cycle, and delivering lubricant from the supply distribution system to lubrication points after determining that the landing gear has experienced a retracted to extended transition, for the duration of a predetermined time interval.

According to a second aspect of the present invention, yet another method and apparatus for automatically lubricating an aircraft landing gear is provided. The method includes providing a lubricant supply system for dispensing a lubricant; providing an actuator on the landing gear such that a first end of the actuator that will move relative to and in response to the pivotal movement of the landing gear truck beam; activating the second end of the actuator through movement of the first, and delivering lubricant from the lubricant supply distribution system to one or more selected sites in response to activation of the second end.

According to a third embodiment of the present invention, an electromechanical system for automatically lubricating an aircraft landing gear is provided. The system includes a lubricant reservoir; a lubricant pump; a lubricant distribution system that fluidly connects the reservoir to the pump inlet and the pump outlet to at least one desired lubrication point; a means for producing a lubrication signal in response to sensed landing gear position parameters; a lubrication cycle timer for controlling the duration of the lubrication cycle; and a means for activating the pump in response to the lubrication signal for the duration of a predetermined time interval.

According to a fourth embodiment of the present invention, yet another electromechanical system for automatically lubricating an aircraft landing gear is provided. The system includes a lubricant supply distribution system for dispensing a lubricant to lubrication critical points; an aircraft landing gear position sensor for indicating the landing gear extended or retracted state; a lubrication cycle timer for controlling the duration of the lubrication cycle; and a control circuit for activating the lubricant supply distribution system in response to determining that the landing gear has experienced a retracted to extended transition, for the duration of a predetermined time interval.

According to a fifth embodiment of the present invention, a mechanical system for automatically lubricating an aircraft landing gear is provided. The system includes an actuator associated with the landing gear assembly wherein the actuator that moves relative to and in response to the pivotal movement of the landing gear truck beam, a pump coupled to the actuator, the pump mechanism operable for pumping in response to movement of the actuator relative to a portion of the truck beam; a lubricant supply distribution system coupled to the pump for supplying lubrication to selected locations in response to pump activation.

The present invention provides significant technical advantages including some of the following: A technical advantage of the present invention is that lubrication is automatically performed minimizing unfavorable impacts to aircraft productivity. A second technical advantage of the present invention is that the lubrication is applied to unloaded critical sites, thereby maximizing the lubricant penetration into the normally highly loaded portion of the bearings. A third technical advantage of the present invention is that the invention is easily retrofittable onto aircraft. Yet, a further technical advantage of the present invention is that the lubrication cycle is not continuous. Another feature according to an embodiment of the present invention is that electrical power is not necessarily required. Still a further technical advantage of the present invention is that the reservoir is easily filled and has the ability to self purge air out of and bootstrap the rest of the system.

BRIEF DESCRIPTION OF THE SEVERAL VIEWS OF THE DRAWING

For a more complete understanding of the present invention and advantages thereof, reference is now made to the following written description taken in conjunction with the accompanying drawings, in which:

FIG. 6b is a control circuit diagram for FIG. 6a;

DETAILED DESCRIPTION OF THE INVENTION

The preferred embodiments of the present invention and its advantages are best understood by referring to FIGS. 1–11 of the drawings, like numerals being used for like and corresponding parts of the various drawings.

Figure 1:
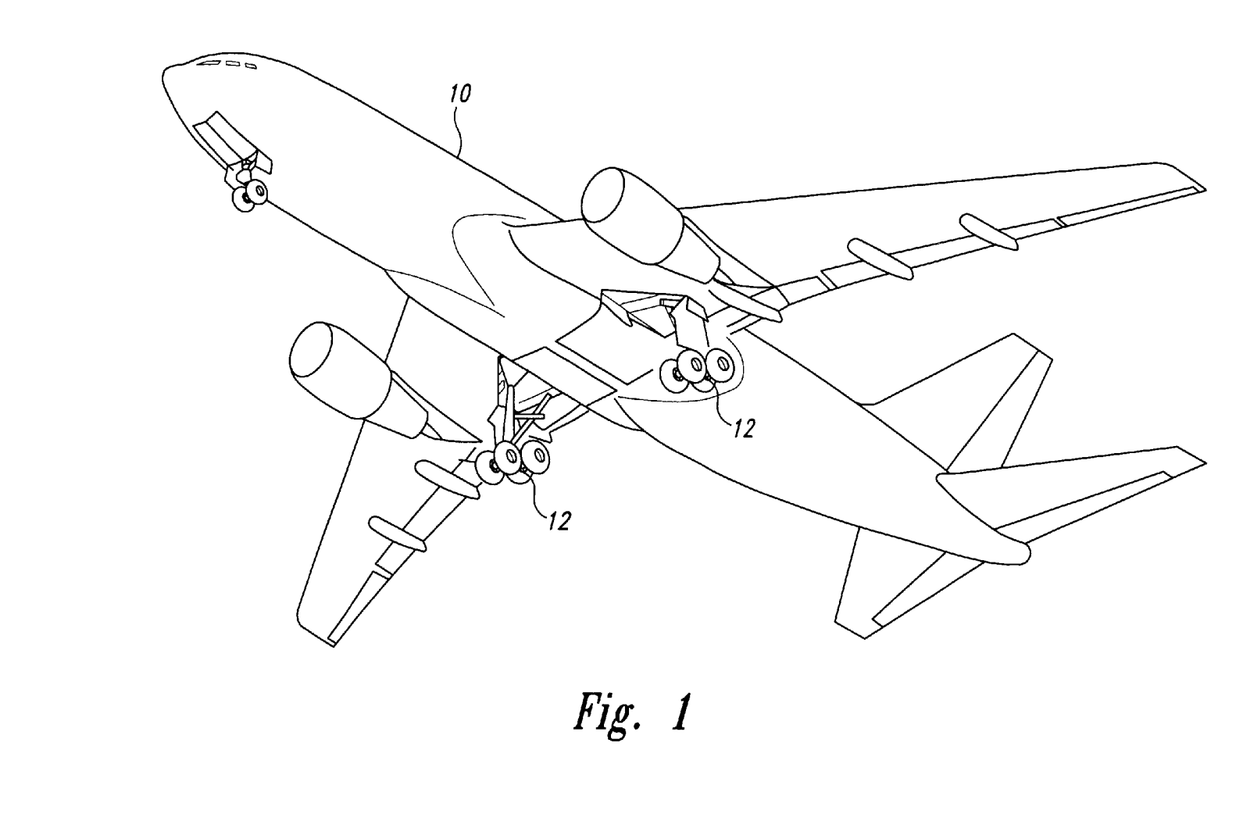
FIG. 1 is a bottom view of an airplane showing the general location of the landing gear for which the invention is particularly suited.

Referring to FIG. 1, an airplane 10 is provided with landing gear assemblies 12 for which the present invention is particularly suited.

Figure 2:
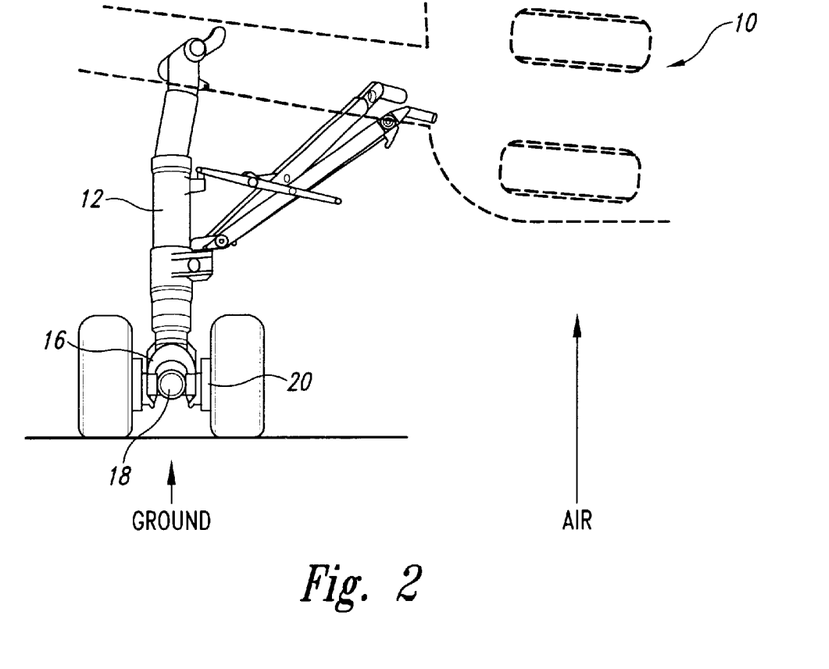
FIG. 2 is a view illustrating landing gear orientation when extended on the ground and retracted in air.

Referring to FIG. 2, the landing gear assembly 12 may be swingingly attached to the airplane 10 for reciprocating movement between an extended position and a retracted position.

Figure 3A:
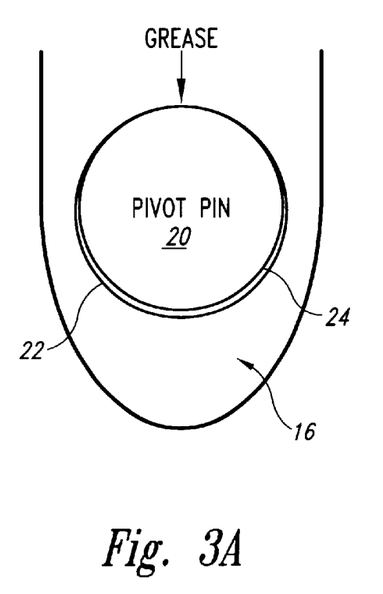
FIG. 3a is a view illustrating how the pivot joint bearings are loaded in relation to the landing gear's "ground" extended position, as illustrated in FIG. 2.
Figure 3B:
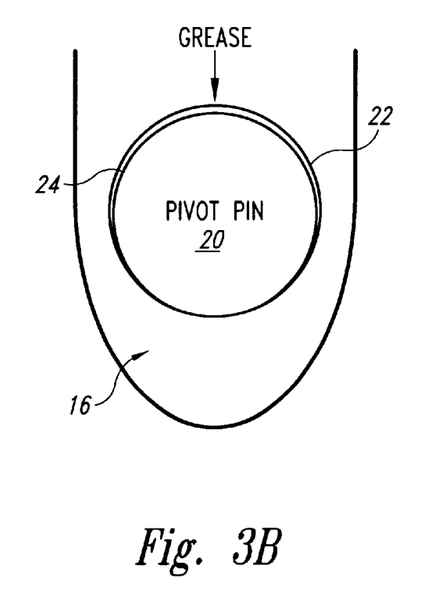
FIG. 3b is a view illustrating how the pivot joint bearings are loaded in relation to the landing gear's "air" retracted position, as illustrated in FIG. 2.

Referring to FIGS. 3A & 3B, the relative influence of the landing gear assembly's 12 extended or retracted orientation respectively on the pivot joint assembly's 20 bearing loading is shown. The pivot joint bearings are typically loaded primarily through less than their full bearing circumference. This results in the unloaded portion of the bearing to define a gap 24, through which new lubricants have been found to take the path of least resistance, leaving the loaded portions deficient of lubrication. The orientation of this gap 24 is shown in relation to the landing gear assembly's 12 extended or retracted position. FIGS. 3A & 3B illustrate that it is therefore advantageous to lubricate the pivot joint assembly when the landing gear is unloaded, preferably when the landing gear is retracted.

Figure 4:
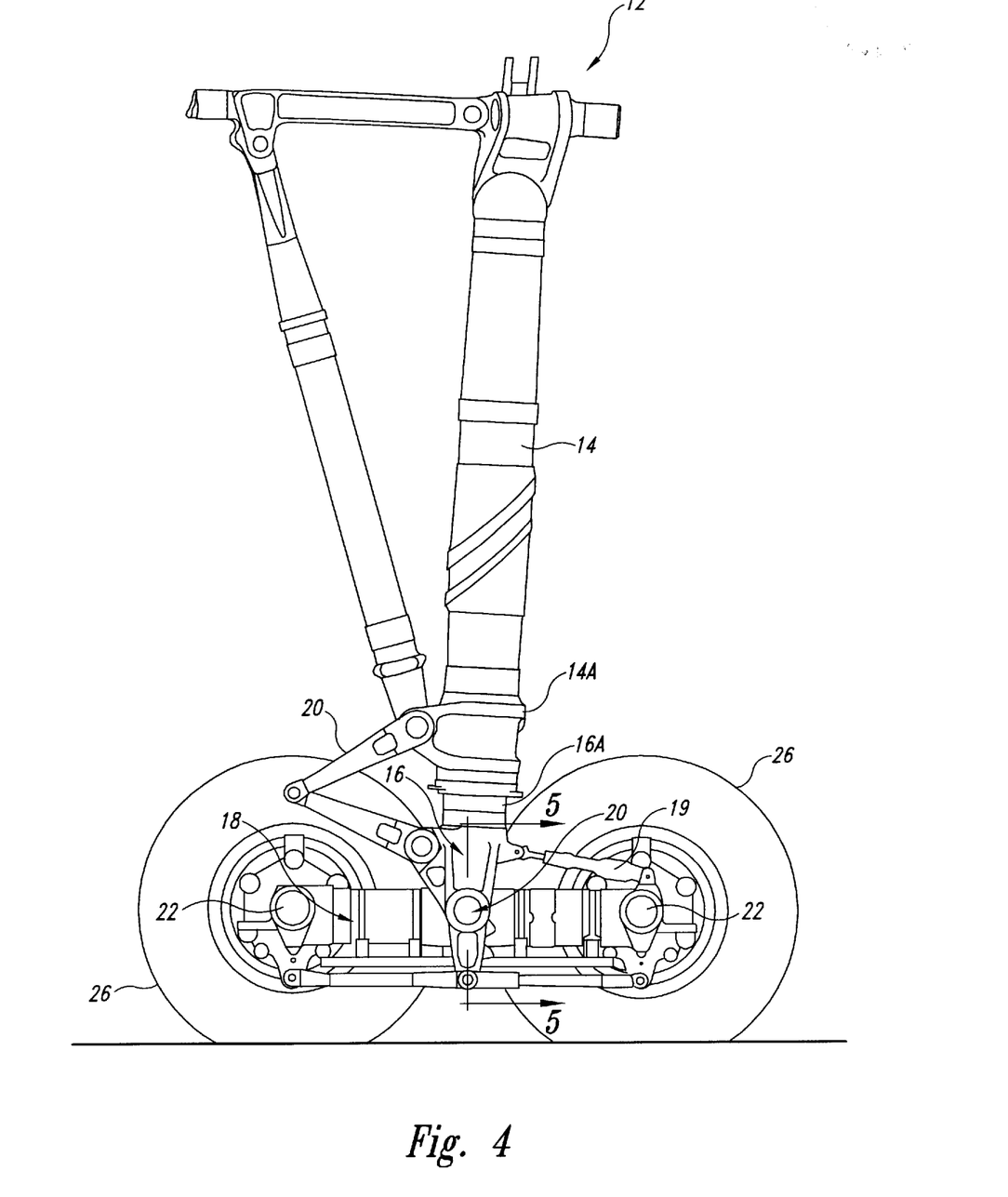
FIG. 4 is a detailed left side view of the landing gear showing the main shock strut, truck beam, and truck beam pivot joint.

Referring to FIG. 4, the landing gear assembly 12 includes an elongate shock strut 14, a truck beam 18, a plurality of axles 22 and a plurality of wheels 26. For ease of illustration, only the inboard set of wheels 26 are illustrated. However, it will be apparent that a landing gear assembly normally includes a second set of wheels positioned parallel to the inboard set. Additionally, although the present landing gear assembly is shown for purposes of illustration with a four-wheeled truck, other landing gear assemblies, such as a six-wheeled truck may be utilized in practicing the present invention.

The shock strut 14 includes a well known telescoping inner 16A and outer 14 strut cylinders. The inner shock strut cylinder 16A is axially slidable within the outer cylinder 14. A shock absorbing mechanism (not shown) is included inside the telescoping inner 16A and outer 14 cylinders to dynamically react ground loads encountered during landing and taxiing of the airplane. The lower end of the inner cylinder 16A includes a bifurcated yoke 16. Rotation of the inner cylinder with respect to the outer cylinder is prevented by upper and lower torsion links 20.

One end of the upper torsion link is pinned to the outer cylinder 14 by an attachment collar 14A and a fastener, such as a pin assembly. The other end of the upper torsion link is pinned to one end of the lower torsion link by a second well known fastener, such as a pin assembly. The lower end of the lower torsion link is pinned to the forward end of the yoke 16 by a third well known fastener, such as a pin assembly. As assembled, the upper and lower torsion links and are foldably attached to the inner 16 and outer 14A; cylinders to resist rotation of the inner cylinder 16 relative to the outer cylinder 14A.

The bifurcated portion of yoke 16 is sized to receive the truck beam 18 therein. The truck beam 18 is pivotably attached to the yoke 16 by a pivot joint assembly 20 to maintain the truck beam 18 parallel to the direction of travel of the airplane. The pivot joint assembly 20 permits the truck beam 18 to pivot about the pivot joint assembly 20 in response to a variety of conditions, such as ground loads encountered during taxiing of the airplane or positioning the truck beam 18 for stowage within the airplane. The wheels 26 are rotatably attached to the truck beam 18 by the axles 22. Although a total of two sets of landing wheels 22 are illustrated in the preferred embodiment, a landing gear assembly having more or fewer sets of wheels, such as four sets or a single set of wheels may be utilized in practicing the present invention.

Figure 6A:
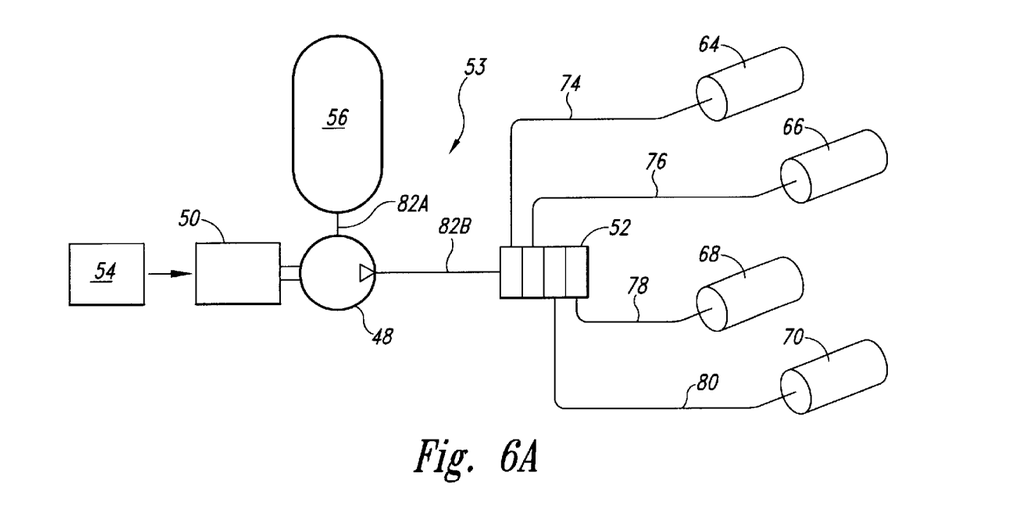
FIG. 6a is a schematic diagram of the preferred embodiment of the present invention.

Referring now to FIG. 6A, a first embodiment of the present invention is shown. The embodiment includes a lubricant supply distribution system 53, a pump 48 and a pump actuation control circuit 54.

A plurality of conduits, 74, 76, 78, and 80 interconnect much of lubricant supply distribution system 53. Lubricant reservoir 56 is fluidly connected to the input of pump 48 by conduit 82A. The output of pump 48 is fluidly connected to lubrication manifold 52 by conduit 82B. Lubrication manifold 52 is connected to a first lubrication point 64 by conduit 74. Lubrication manifold 52 is connected to a second lubrication point 66 by conduit 76. A third lubrication point 68 is connected to lubrication manifold by conduit 78. Finally, lubrication manifold 52 is connected to a fourth lubrication point 70 by conduit 80. It is understood that while the specific embodiment shown in FIG. 5 for purposes of illustration includes four lubrication points 64, 66, 68 and 70, more or less lubrication points could be utilized.

Figure 5:
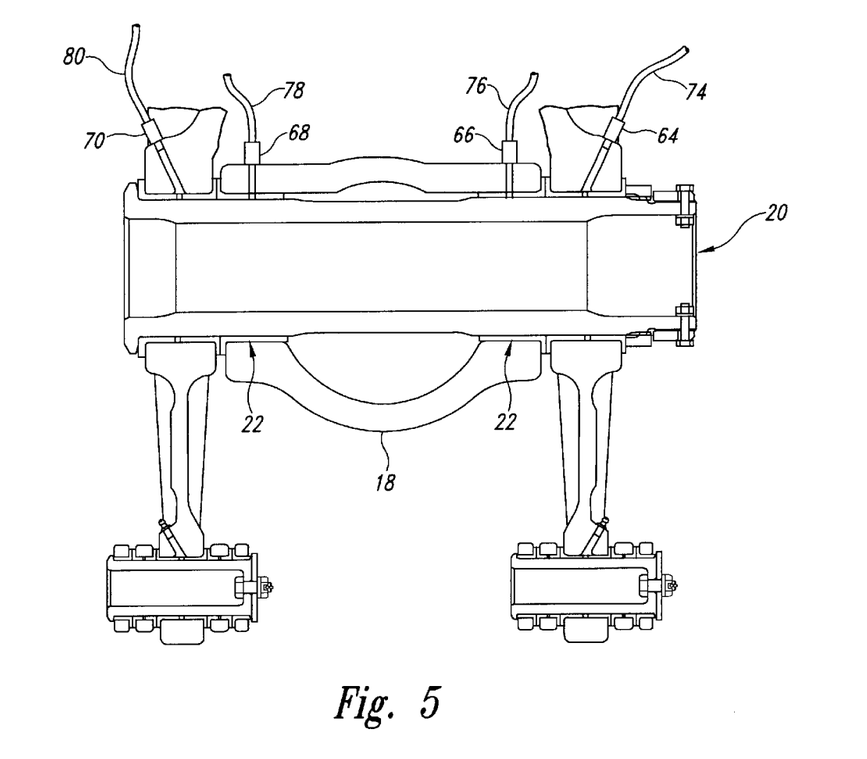
FIG. 5 is a cross-sectional view of pivot joint illustrated in FIG. 5, further illustrating internal passages for lubrication.

Referring to FIG. 5, there is shown an expanded cut away view of pivot joint assembly (of FIG. 4) 20 showing the internal lubrication passages leading to critical site 22 (of FIG. 4). Also shown are the internal lubrication points (64, 66, 68, 70) in fluid communication with the lubricant supply distribution system conduits (74, 76, 78, 80).

Figure 6B:
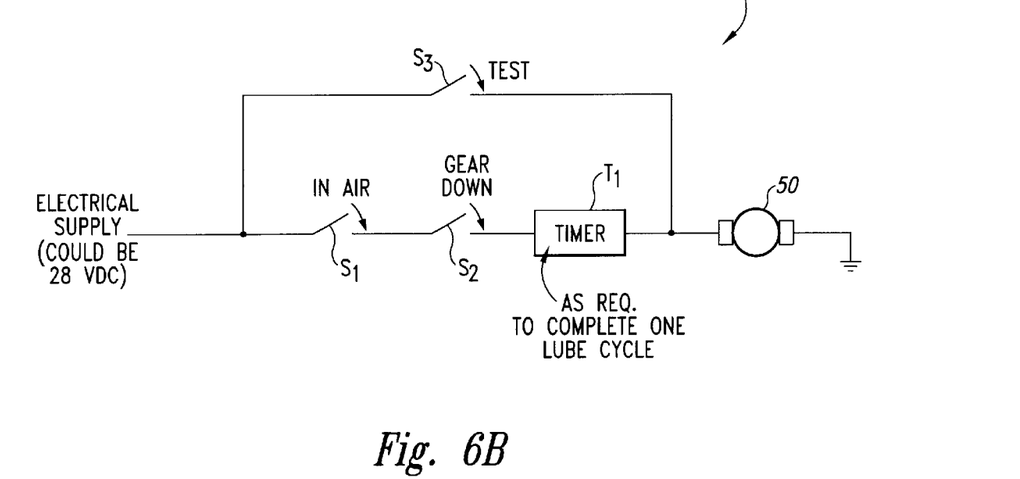

Referring to FIG. 6B, a pump actuation control circuit 54 for energizing the pump motor 50 is shown. The control circuit includes a control portion and a test portion. The control portion includes a power supply, an air/ground sensing switch S1, a Landing Gear Down sensing switch S2, and a lubrication cycle duration timer T1, all connected in series from the power supply to the pump motor 50. The test portion of the circuit includes a switch S3 that is connected in parallel to the control portion, from the power supply to the pump motor 50. In normal mode operation, commanding landing gear down while the airplane is airborne energizes lubrication pump motor 50 for a period of time controlled by timer T1. S1 is enabled when the aircraft is airborne & provides logic that protects from un-commanded pump activation during spurious aircraft power transients characteristic of engine starts and power bus transfers. S2 is enabled when the landing gear experiences a gear up to gear down transition. Depending on the airplane, there are many convenient sources for S1 and S2. Further, it is apparent that the control circuit could be configured to energize the pump motor 50 anytime the landing gear is in an unloaded state, without departing from the spirit of the invention. In test mode operation, S3 bypasses the control portion of the circuit providing power directly from the power supply to the pump motor. S3 is provided for routine maintenance testing and trouble shooting. The duration of the period should be of sufficient time to lubricate the pivot joint without the production of excess lubricant. Other factors such as the relative pumping power of the pump, the viscosity of the lubricant, the expected operational temperatures and the relative fluidic resistance of the desired lubrication site will influence the duration of the lubrication cycle. It is understood by those skilled in the art that conventional petroleum lubricants have a wider temperature dependant viscosity index change than modern synthetic lubricants. Therefore, a characteristically more viscous lubricant will require a longer duration than a less viscous lubricant.

Figure 7:
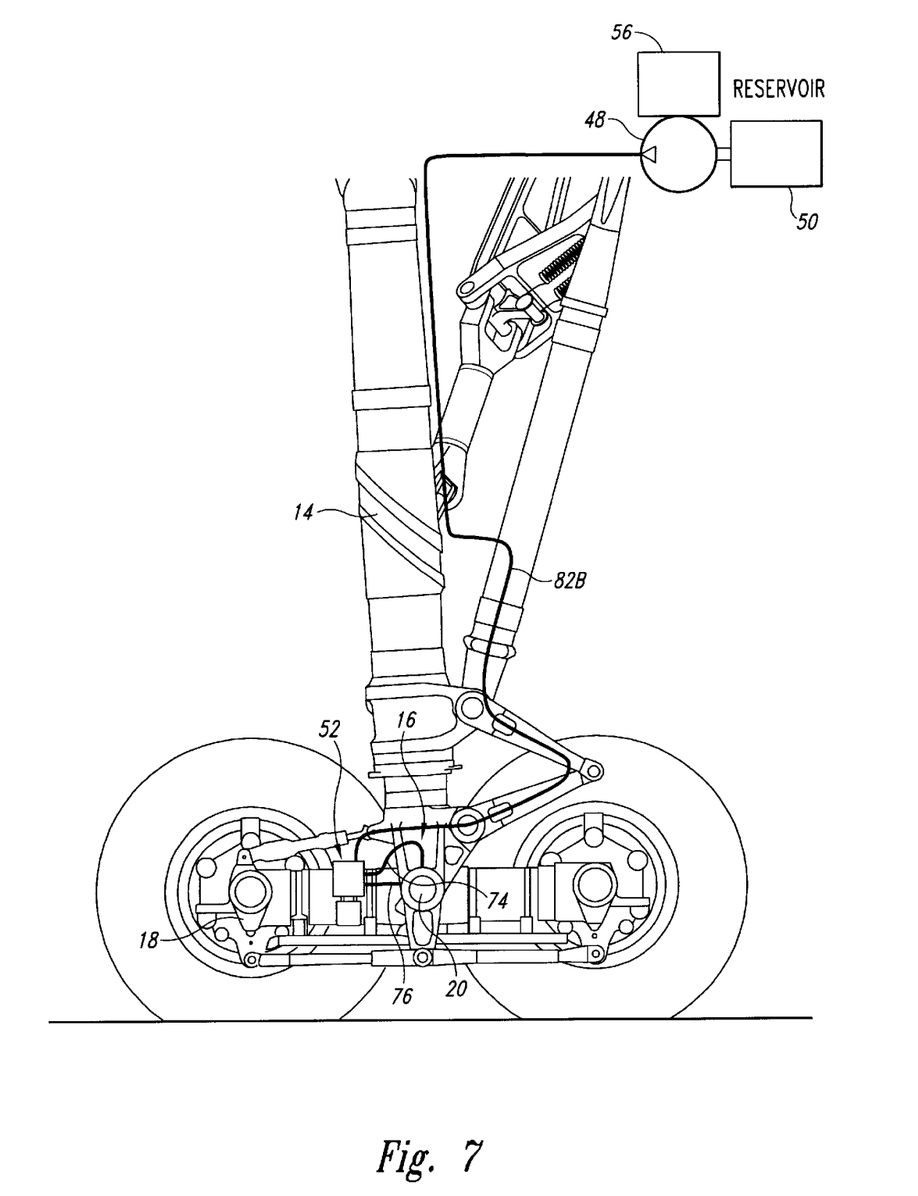
FIG. 7 is a right side view of FIG. 4 with the preferred embodiment of the present invention installed.
Figure 8:
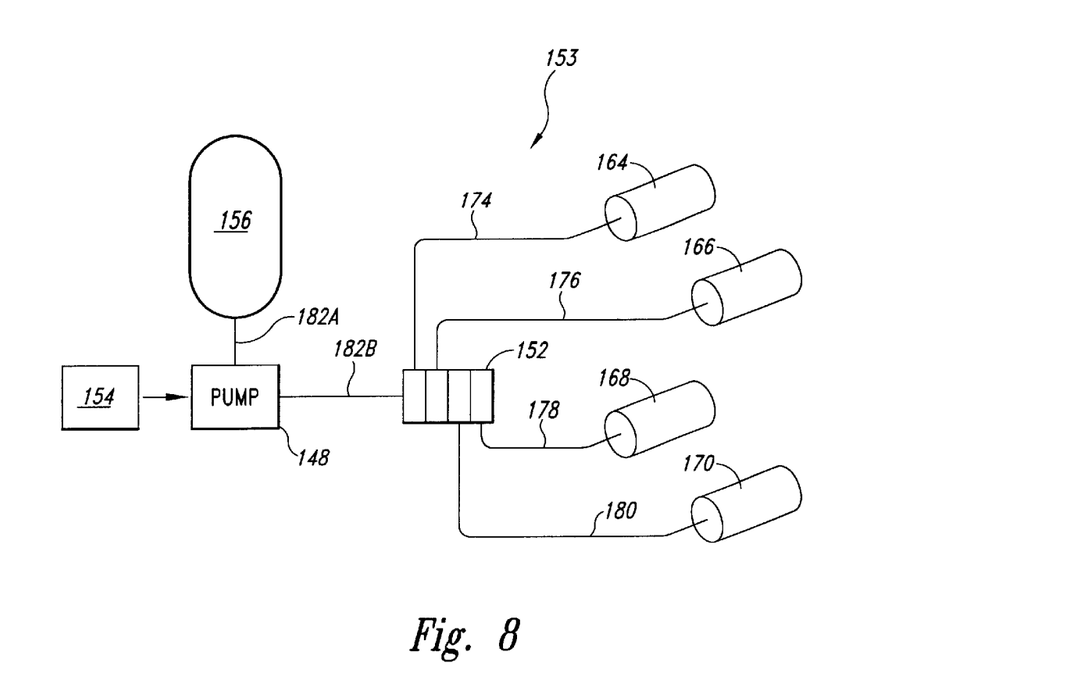
FIG. 8 is a schematic diagram of an alternative embodiment of the present invention.

Referring to FIG. 7, the pump 48 and reservoir 56 may be mounted in the aircraft wheel well or at any other convenient location. The pump 48 and reservoir 56 may be integrated into one unitized package or separate components. Reservoir 56 may be located remote from other elements of the lubrication system to provide easy maintenance access or to provide a relatively warmer environment for the lubricant in consideration of lubricant viscosity and extreme temperatures characteristic of aircraft operating environments. When pump motor 50 is energized by control circuit 54, a lubricant is forced from the reservoir 56 through the pump 48 into the lubrication manifold 52 for distribution to the various lubrication sites. Reservoir 56 may be a pressurized tank or accumulator to provide "boot strapping" the system, and may be sized to have sufficient capacity to require filling only at normal maintenance intervals.

Figure 10:
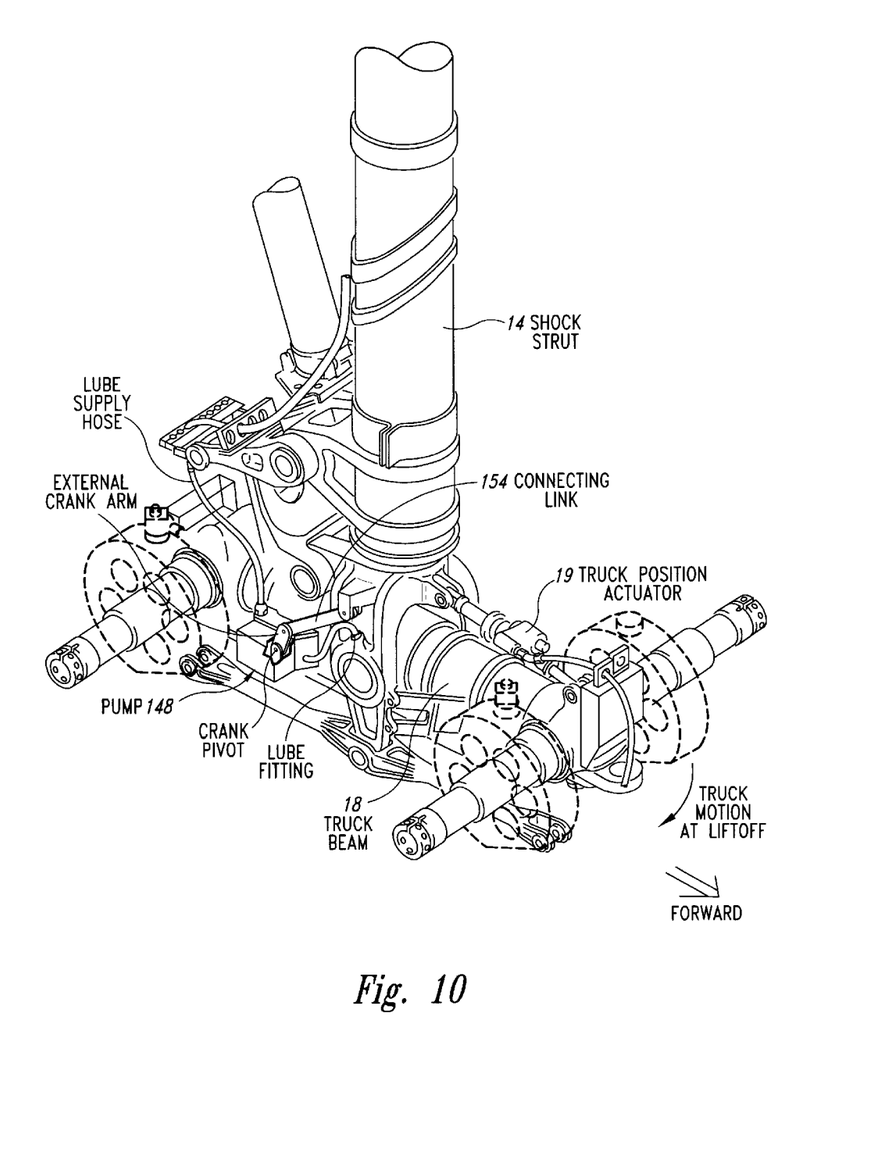
FIG. 10 is a view of FIG. 4 with the alternative embodiment of the present invention installed.
Figure 11:
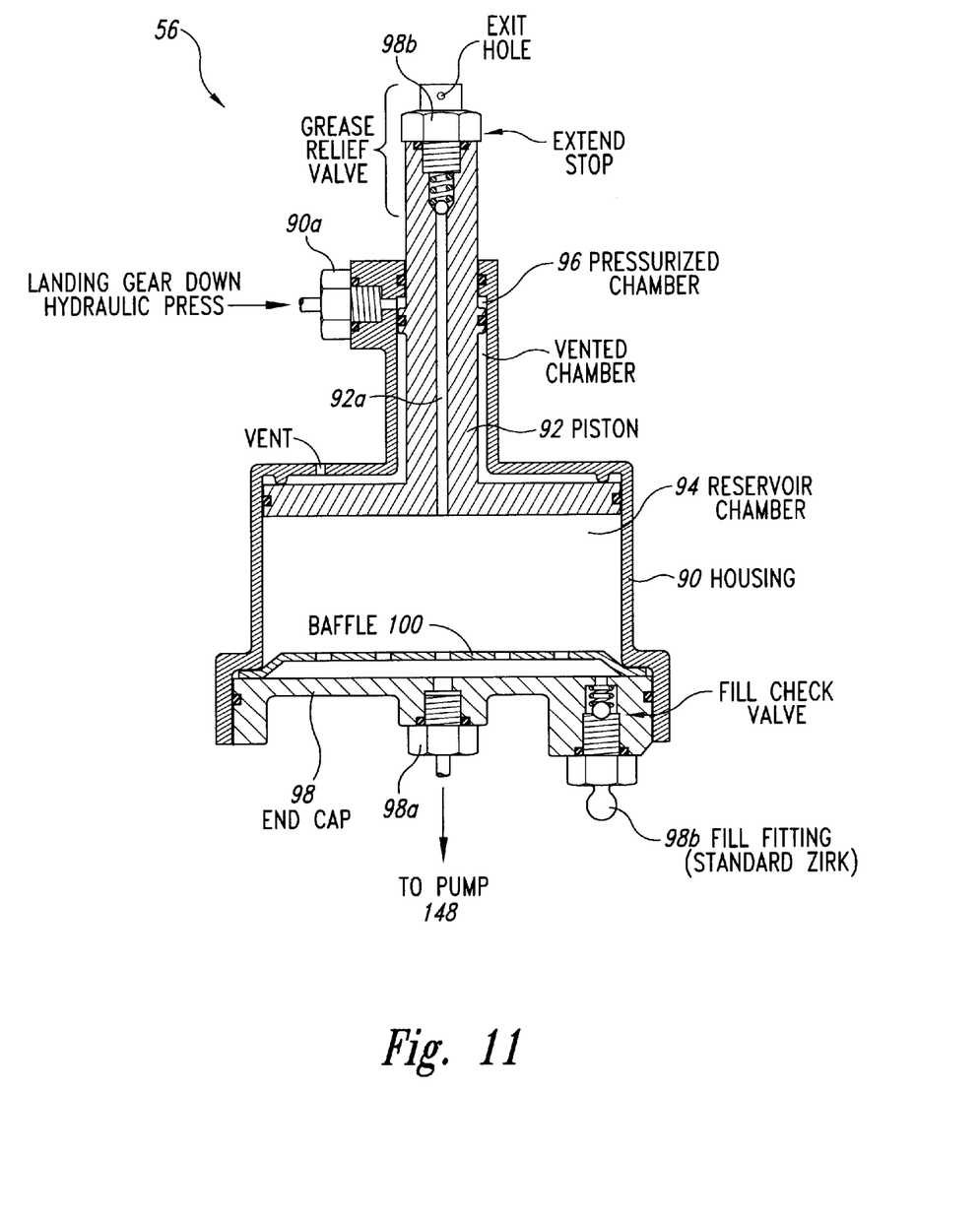
FIG. 11 is a cross-sectional view of the reservoirs (56, 156, 56) shown in shown in FIGS. 6a, 7 and 8 respectively.

Referring to FIG. 11, a preferred pressurized reservoir 56 is shown. The reservoir includes a housing 90 having a stepped chamber defining a piston bore and piston-rod bore. A piston assembly 92 is disposed therein and is free to reciprocate axially within the chamber dividing it into a lubricant reservoir chamber portion 94 and a pressurized chamber portion 96. The piston has an air exit passage 92a extending from the reservoir side piston face, axially through the piston assembly to the piston-rod end. An integral grease relief valve-extend stop 98b terminates the piston-rod end of the air exit passage. The passage 92a provides fluid communication from the reservoir chamber 94 to the housing's exterior through the grease relief valve-extend stop 98b. An endcap 98 terminates one end of the housing defining the reservoir chamber 94 and has a pressure outlet 98a and fill inlet 98b disposed therein. The reservoir outlet is connected to pump (48, 148 of FIGS. 6A and 10) via conduit (82A, 182A). The pressurized chamber portion 96 is connected to the airplanes landing gear hydraulic system. The piston is urged towards the endcap 98, pressurizing the reservoir 94 in response to the pressurized hydraulic fluid being supplied to the pressurized chamber 96 via the conduit from the aircraft's landing gear hydraulic system. The position of the piston assembly 92 and therefore the reservoir quantity 94 may be ascertained by visual inspection of the externally exposed piston rod position in relation to the housing 90. Travel of the piston assembly in either axial direction is limited by the grease relief valve-extend stop 98b in one direction and the housing 90 in the other. The reservoir chamber 94 is refilled using the endcap fill inlet 98b. A check valve within the inlet 98b seals the inlet against reservoir pressure during normal operation. A baffle 100 is disposed between the endcap 98 and the housing 90 adjacent to the reservoir chamber 94 to cause the lubricant to enter the reservoir chamber 94 in a level fashion and also allows air to escape out the air exit passage 92a through the grease relief valve-extend stop 98b. The exit of lubricant out the grease relief valve-extend stop 98b, during the refilling operation, gives a visual indication that the reservoir chamber 94 is full.

Figure 9A:
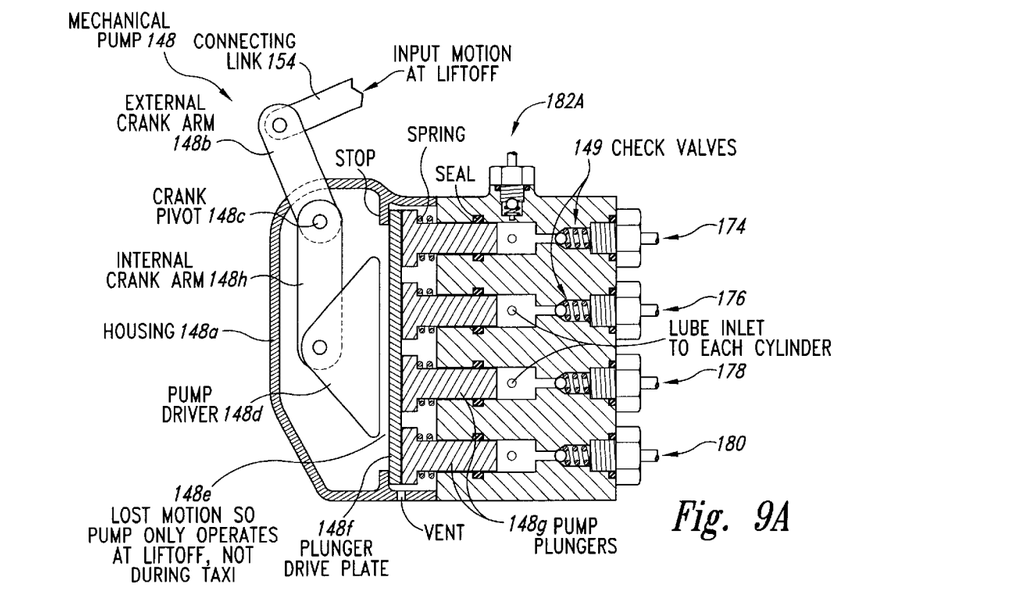
FIG. 9a is a cross-sectional view of the "pump" shown in FIG. 8.

Various changes ma be made to the present lubrication system invention, for example, electric pump 48 could be replaced by a purely mechanical pump, and advantageously relocated to utilize the relative motion between landing gear components to actuate the pump. One such pump is shown is shown in FIG. 9A. Referring to FIG. 10, the pump 48 has been replaced by a plunger actuated multicylinder pump 148 and relocated to the landing gear truck beam 18. The pump actuation control circuit 54 is replaced by a mechanical actuation connecting link 154. One end of the link is pivotally connected to the bifurcated yoke 16. The other end is pivotally connected to the pumps 148 external crank arm 148b. As in a preferred embodiment, lubricant is supplied to the pump from the reservoir using a conduit 182A. However, check valve 149 is used to prevent the pump from forcing the lubricant back to the reservoir during pump deactivation.

In normal operation, when the aircraft is being supported by it's deployed landing gear 12, the pump 148 is unpressurized due to the lack of relative motion between the landing gear truck beam 18 and the bifurcated yoke 16. The lost motion clearance 148e between pump driver 148d and pump plunger drive plate 148f prevents small relative motions between the beam 18 and yoke 16, that are characteristic of taxiing & takeoff roll, from actuating the pump plungers 148g & therefore pressurizing the pump 148. When the airplane experiences a transition to not being supported by its deployed landing gear 12 such as at liftoff, the landing gear truck beam 18 pivots about pivot joint 20 in response to the influence of gravity and/or a stowage actuator 19. The relative motion between the truck beam 18 and the bifurcated yoke 16 causes the actuation connecting link 154 to activate the pumps 148 mechanical actuation crank arm assembly (154, 148*b*, 148*h*, 148*d*), which in turn actuate the multi-cylinder pump plungers 148*g*. Lubricant is forced to the desired lubrication sites similar to those of a preferred embodiment of the present invention.

Figure 9B:
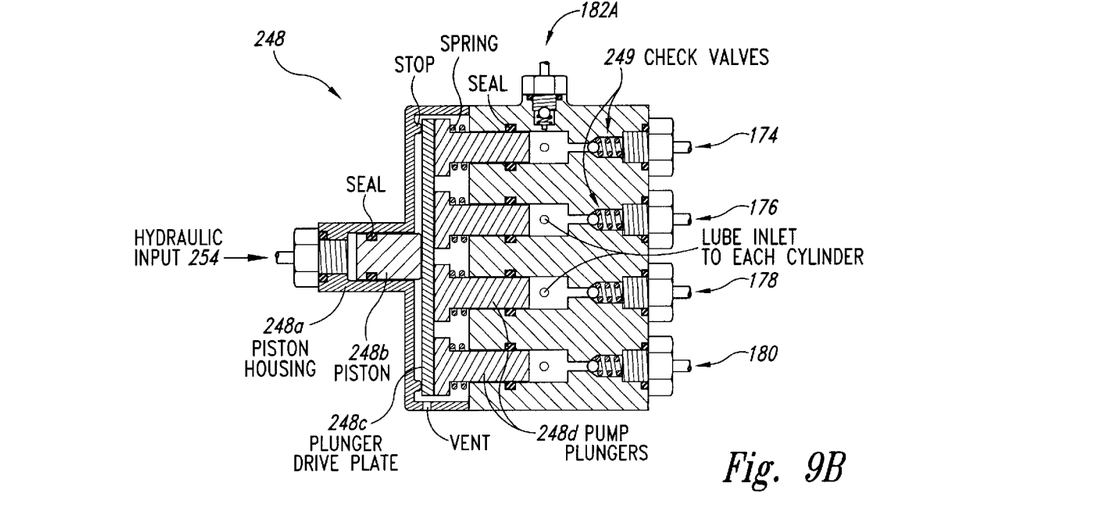
FIG. 9b is a cross-sectional view of an alternative "pump" shown in FIG. 8.

Yet another change, for example, may be made to the present in flight autolubrication system wherein the mechanical pump 148 could be replaced by a hydraulically actuated pump. One such pump 248 is shown is shown in FIG. 9B. In FIG. 9B, a hydraulic piston housing 248*a* and piston 248*b* replaces the mechanical actuation crank arm assembly (154, 148*b*, 148*h*, 148*d*) shown in FIG. 9A, and is used to actuate the multi-cylinder pump 248 shown in FIG. 9B. The hydraulic piston housing 248*a* of pump 248 is slaved to a convenient source of hydraulic pressure 254 that is active when the landing gear experiences an extension or retraction transition. A preferred hydraulic source 254 would be the landing gear up actuation system because many landing gear systems use gravity as an extension means to save weight. In either case, it is apparent that the landing gear pivot joint will be advantageously unloaded in either case.

Although the present invention has been described in detail, it should be understood that various changes, substitutions and alterations can be made hereto without departing from the spirit and scope of the invention.

What is claimed is:

1. An automatic lubrication system for an aircraft's landing gear comprising;

said endcap further comprising a pressure outlet and fill inlet disposed thereon; and said piston assembly urges towards the endcap pressurizing the reservoir in response to the pressurized hydraulic fluid supplied to the pressurized chamber.

a lubricant reservoir;

a lubricant pump for providing motive force for moving lubricant;

a lubricant distribution; system fluidly coupling the lubricant reservoir to the pump;

said lubricant pump fluidly coupled to at least one lubrication point;

means for producing a lubrication signal in response to sensed aircraft parameters;

means for activating the lubricant pump in response to said lubrication signal;- a housing having a stepped chamber defining a piston bore and piston-rod bore;

a piston assembly disposed in said housing free to reciprocate axially wihtin the chamber and dividing into a lubricant reservoir chamber portion and a pressurized chamber portion;

an air exit passage extending from the reservoir side piston face axially through the piston assembly to the piston-rod;

an endcap terminating one end of the housing defining the reservoir chamber.

2. In combination in an aircraft landing gear:

a pivot joint for pivotally attaching a truck beam to a main shock strut;

a lubricant supply distribution system for lubricating said pivot joint;

a timing circuit for delivering lubricant from said lubricant supply distribution system to said pivot joint for a predetermined time interval; and said timing circuit responsive to the position of said aircraft landing gear.

3. A method of lubricating a landing gear lubrication point comprising the steps of:

determining the landing gear lubrication point is in an unloaded state; and delivering a lubricant to said landing gear lubrication point for a predetermined time interval when said landing gear lubrication point is in an unloaded state.

4. A method for lubricating an aircraft landing gear comprising:

utilizing a not continuous automatic lubrication cycle to lubricate normally ungreasable portions of the bearings in said aircraft landing gear in flight while said bearings are in an unloaded state; and utilizing a lubrication reservoir capable of self purging air out of and bootstrapping tihe lubricating system.

* * * * *